(12) United States Patent
Dratt

(10) Patent No.: US 6,196,159 B1
(45) Date of Patent: Mar. 6, 2001

(54) METHOD AND APPARATUS FOR THE CONTINUOUS INCUBATION OF EGGS

(76) Inventor: Rainer Dratt, Am Kolk 13, D-39626 Bismark (DE)

(*) Notice: Subject to any disclaimer, the term of this patent is extended or adjusted under 35 U.S.C. 154(b) by 0 days.

(21) Appl. No.: 09/192,731

(22) Filed: Nov. 16, 1998

(30) Foreign Application Priority Data

Nov. 14, 1997 (DE) .............................. 197 50 398

(51) Int. Cl.[7] .................................................. A01K 41/00
(52) U.S. Cl. ............................................................ 119/300
(58) Field of Search .................................. 119/300, 322, 119/323, 324, 325, 326, 329, 330, 334, 335, 342, 347

(56) References Cited

U.S. PATENT DOCUMENTS

| | | | |
|---|---|---|---|
| 3,003,463 | * 10/1961 | Rijcke | 119/300 |
| 3,132,735 | * 5/1964 | Nilsen | 119/300 |
| 3,489,124 | * 1/1970 | Cannon | 119/300 |
| 4,398,499 | * 8/1983 | Blakely | 119/300 |
| 4,558,661 | * 12/1985 | Theilig et al. | 119/300 |
| 5,046,454 | * 9/1991 | Jensen | 119/300 |
| 5,568,791 | * 10/1996 | Dratt | 119/300 |

* cited by examiner

*Primary Examiner*—Thomas Price
(74) *Attorney, Agent, or Firm*—Karl Hormann

(57) ABSTRACT

A method and apparatus for incubating a poultry egg by placing the egg in a random orientation into an opening of substantially elliptical configuration provided in an egg support, placing the egg support into a receiving tray provided with an elevation facing the opening such that the egg engages the protrusion, reciprocally moving the egg support relative to the tray thereby to impart to the egg an optimum incubating orientation, subjecting the egg to incubation while maintaining the orientation and rotating the egg about its major axis.

14 Claims, 4 Drawing Sheets

METHOD AND APPARATUS FOR THE CONTINUOUS INCUBATION OF EGGS

BACKGROUND OF THE INVENTION

1. Field of the Invention

The invention, in general relates to a method and apparatus for incubating poultry eggs, and, more particularly, to the incubation of eggs placed in a predetermined disposition within a tray.

2. The State of the Art

It is generally known that for incubation, eggs are placed onto trays which are then inserted into single or multi-tier shelves or caddies. Several methods and apparatus aiming at providing efficient incubation processes have become known.

Thus, German Patent DE 4,407,407 discloses a method and an apparatus for the incubation of eggs, the method being practiced by placing, transporting, storing and incubating the eggs on an egg support. Until the hatched chicks are removed from the supports, the eggs are not manipulated in any way outside of the incubation container or machine.

The necessary turning of the eggs to simulate natural brooding is realized by a device acting from the exterior on the tray caddies and egg supports within the incubation machine. To this end, during incubation the egg supports are placed on the bottom of the incubation tray such that the eggs touch the tray without having any circumferential contact free with the egg receptacles. While the configuration of the egg receptacles generally resembles the shape of the eggs, the receptacles nevertheless cannot fully prevent independent rolling and tumbling of the eggs.

The primary purpose of the known structure is to avoid repeated manipulations of the eggs between the time they are placed on the egg supports and the time they are hatched in order to yield positive incubation results by this manner of storage, transport and incubation.

An essential drawback of the apparatus is that during incubation the eggs are not placed in an exact position and, as mentioned above, they may to some extent move and roll away from their incubation position, thereby adversely affecting the result of the incubation.

OBJECTS OF THE INVENTION

It is, therefore, a general object of the invention to provide an incubation apparatus in which eggs are prevented from moving out of their assigned orientation.

Another object of the invention is the provision of an incubation apparatus in which eggs assume a stable incubation position once they have been placed on their tray.

A still further object of the invention is to provide an incubation apparatus in which eggs remain in their assigned orientations from the time they are placed on the bottom of a tray until they are hatched.

It is also an object of the invention to provide a method of incubating eggs by placing them in a predetermined orientation and ensuring that they remain in this orientation during the entire incubation cycle.

BRIEF SUMMARY OF THE INVENTION

In accordance with the invention, a currently preferred method of incubation includes the steps of placing eggs in random orientation into egg receptacles provided in an egg support, reciprocally moving the egg support to impart to the eggs an optimum orientation for incubation with the air chamber of the eggs facing upwardly, and turning or rotating the eggs at predetermined intervals thereby ensuring, by simulating natural conditions, that incubation is carried out in at least two different incubation positions.

In accordance with a preferred embodiment the apparatus in accordance with the invention comprises a substantially planar egg support provided in its surface with egg receiving apertures of substantially elliptical planar section provided with a recess at each pole and an eggs tray having an undulating surface configuration adapted to receive the egg support at a predetermined spacing therefrom.

In accordance with the invention, a novel incubation method is being proposed which progresses in continuous steps of loading eggs onto an egg support, storing and transporting the eggs as well as incubating and brooding.

An important element of the invention is that the eggs are deposited on the egg support in random orientation without any precisely defined position, that by definable movements they are thereafter moved into their stable and optimum incubation orientation in which the eggs are disposed at an angle of inclination of about 20° relative to the plane of the egg support. Another important element of the invention is that the eggs are always oriented such that their air chamber faces upwardly during the entire incubation cycle.

Turning of the eggs as an essential element of the incubation cycle is carried out at predetermined intervals by relative movement of the bottom of the egg tray relative to the egg support so that all eggs are incubated in at least two different orientations in a manner simulating natural conditions in a nest.

In accordance with a further aspect of the invention the eggs are placed in random orientation into the receptacles provided in the egg support into contact with the surface of the egg tray, that the support and the tray are reciprocally moved relative to each other thereby to move the eggs into an optimum orientation for incubation. They then remain in this orientation until the end of the incubation cycle. The reciprocal movement is such that the eggs are tilted about their major axis.

The apparatus in accordance with the invention consists of an egg support provided in its surface with substantially elliptical egg receiving openings approximating the contour of an egg and cooperating with an egg tray having an undulating or corrugated surface structure comprising alternating elevations and depressions. Preferably, the elevations are spaced such that they substantially coincide with the longitudinal center of the openings.

BRIEF DESCRIPTION OF THE SEVERAL DRAWINGS

The novel features which are considered to be characteristic of the invention are set forth with particularity in the appended claims. The invention itself, however, in respect of its structure, construction and lay-out, as well as manufacturing techniques, together with other objects and advantages thereof, will best be understood from the following description of preferred embodiment when read with reference to the appended drawings, in which:

DETAILED DESCRIPTION OF A PREFERRED EMBODIMENT

Figure 1:
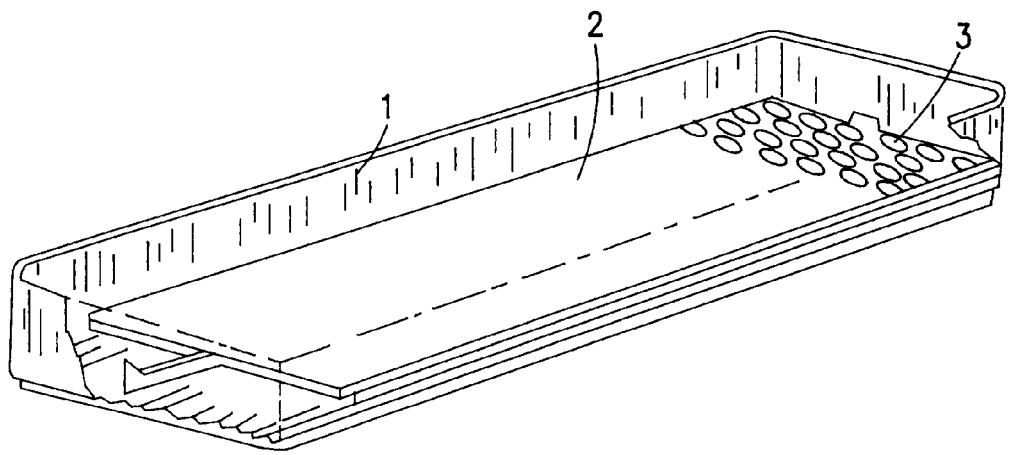
FIG. 1 is a perspective view, with parts broken away for clarity, of an incubation tray having an egg support placed therein.

In accordance with the method of the present invention, eggs 8 to be incubated are deposited in random orientations on egg supports 2. The orientation of the egg supports 2 within a tray 1 may be adjusted in vertical and an horizontal directions. FIG. 1 depicts an egg support 2 placed into an egg tray 1 and provided with egg receptacles 3 some of which are occupied by eggs 8 in random orientation, i.e. they are not assigned to defined positions on the egg support 2. The receptacles 3 are openings of substantially elliptical configuration resembling at least part of the contour of an egg. Once an incubation tray 1 is fully loaded with eggs 8 it may be placed, together with the tray 1, into an appropriate caddy or rack (not shown) provided with one or more tiers for storage or subsequent insertion into an incubation machine.

As a result of reciprocally moving the egg support 2 in a direction parallel to the major axes of the elliptical egg receptacles 3 and of the functional relationship between the shape of the egg receptacles 3 and the design of the bottom 7 of the incubation tray 1, the eggs 8 are moved into their stable and optimum incubation orientation. This is accomplished by transferring the movement of the egg support 2 to the eggs 8. This in turn subjects the eggs 8 to rhythmic movements which in turn imparts movement to the eggs 8 into their stable incubation orientation. This movement is enhanced or facilitated by the shape of the egg receptacles provided in the supports 2 which generally conforms to the shape of the eggs and thus positioning and guiding the eggs 8 by peripheral engagement therewith.

The incubation tray 1 and the egg support 2 may be made of metal or of a polymeric material of a kind which is dimensionally stable even when exposed to elevated temperatures for extended periods of time.

Figure 2:
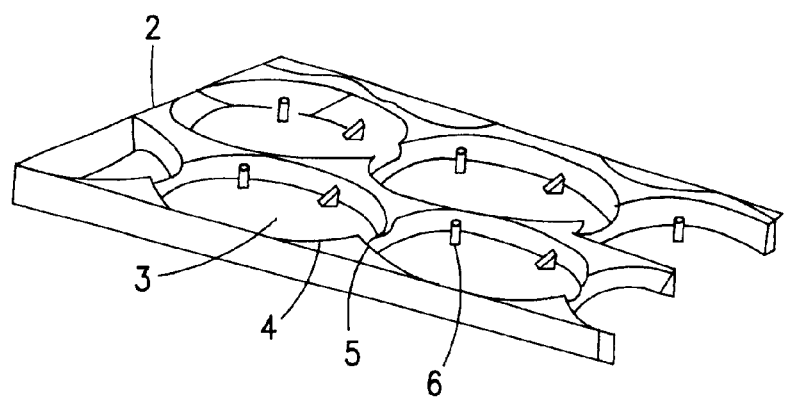
FIG. 2 is a perspective view on an enlarged scale, with parts broken away, of an egg support.

FIG. 2 depicts an egg support 2 of the kind here under consideration and the spatial arrangement as well as configuration of the egg receptacles 3 therein. The receptacles 3 are of generally elliptical configuration conforming generally to the external shape of eggs. They constitute cup-shaped brackets 4 which instead of being closed at their poles, are provided with recesses 5. The recesses 5 ensure that the eggs 8, after being deposited on the support 2 and upon initiation of the reciprocal movements, will assume their stable and optimum incubation orientation.

The depth of the recesses 5 at the poles of the cup-shaped brackets 4 relates to the upper margin of the brackets 4 such that the eggs 8 may unimpededly assume their stable and optimum incubation orientation. The incubation orientation of the eggs 8 is shown in FIG. 5 and will hereafter be described in further detail.

Figure 3:
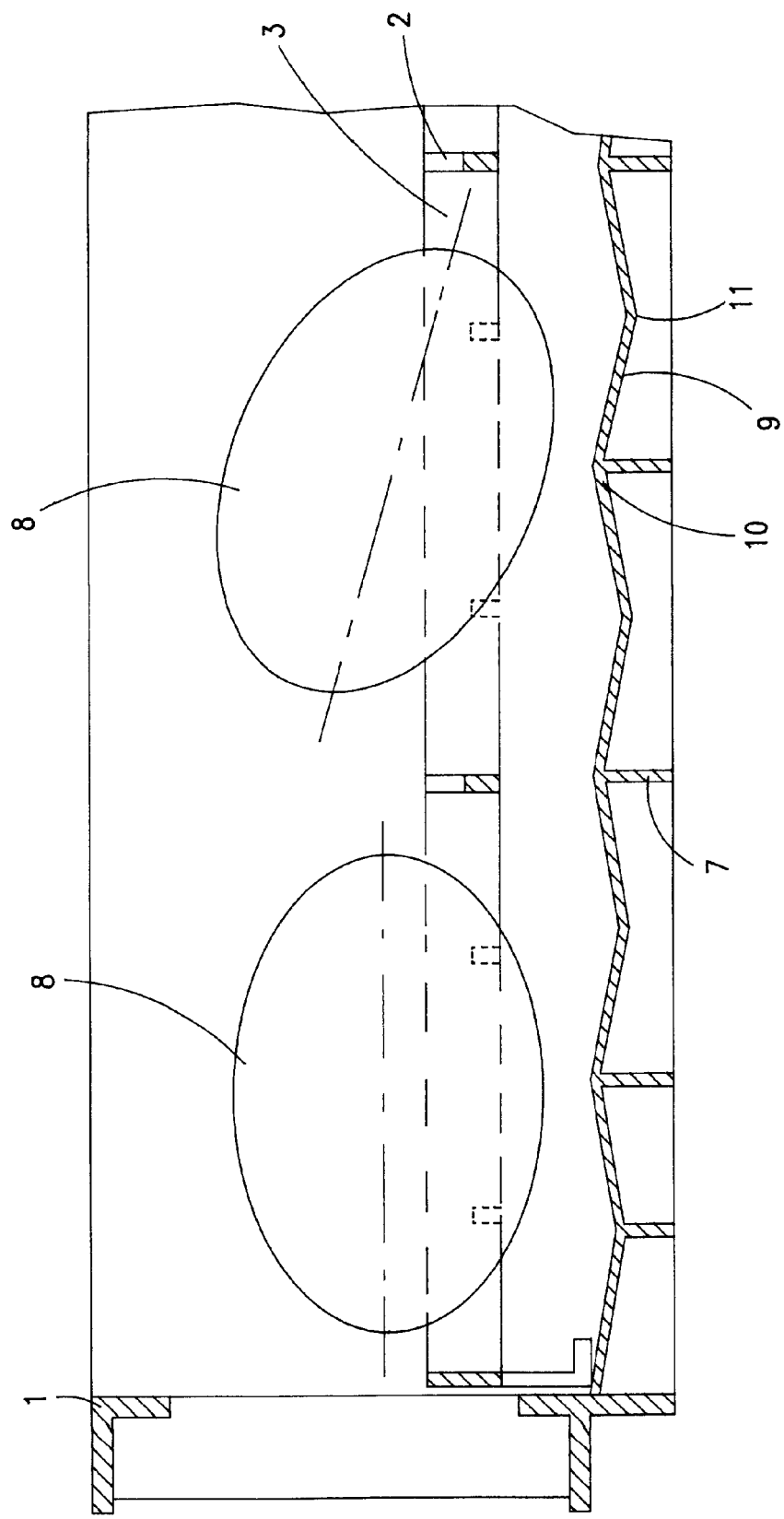
FIG. 3 is a cross-sectional view of an incubation tray with an egg support in an initial orientation therein.

The arrangement of the incubation tray 1 and its specially configured bottom 7, as well as its relationship with the egg support 2 are depicted in cross-section in FIG. 3. An essential element of the novel incubation tray 1 is that its bottom 7 is specially configured. In accordance with the invention the bottom 7 has an undulating profile 9 provided with alternating elongate elevations 10 and depressions 11. The manner in which the egg support 2 is positioned in the incubation tray 1 may also be seen. In this context, it is to be noted that each elevation 10 of the undulating or corrugated profile is disposed in the longitudinal center of an egg receptacle 3. As may also be seen, the egg receptacles 3 are cup-shaped brackets 4 and the upper margins of the recesses 5 are disposed below the upper margin of the brackets 4.

Figure 5:
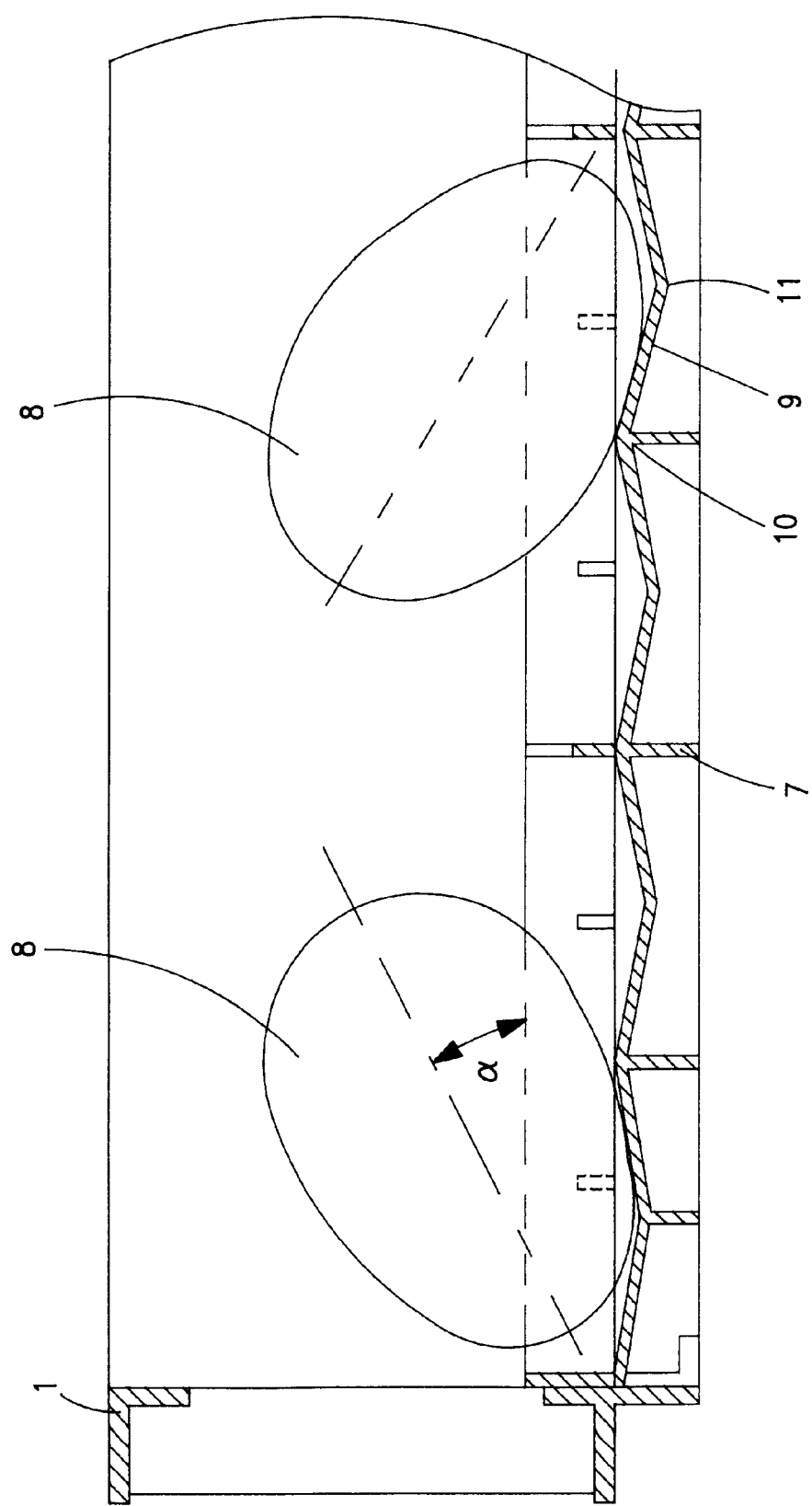
FIG. 5 depicts eggs in their stable incubation orientation in an apparatus according to the invention.

The incubation orientation of the eggs 8 in the egg support 2 is schematically shown in FIG. 5. As shown, in their optimum incubation orientation the eggs 8 are disposed within the egg support 2 in an inclined orientation such that their air chamber faces upwardly. The eggs 8 assume this optimum orientation after they have been lowered to the bottom of the tray followed by a few reciprocal movements of the egg support relative to the incubation tray. They will remain in this orientation until the chicks are hatched. In this optimum incubation orientation, the angle of inclination α between the longitudinal axis of the egg 8 and the plane of the egg support 2 is about 20°. In this orientation, the eggs at one point are supported by the surface of the bottom 7 and circumferentially by the cup-shaped brackets 4.

Figure 4:
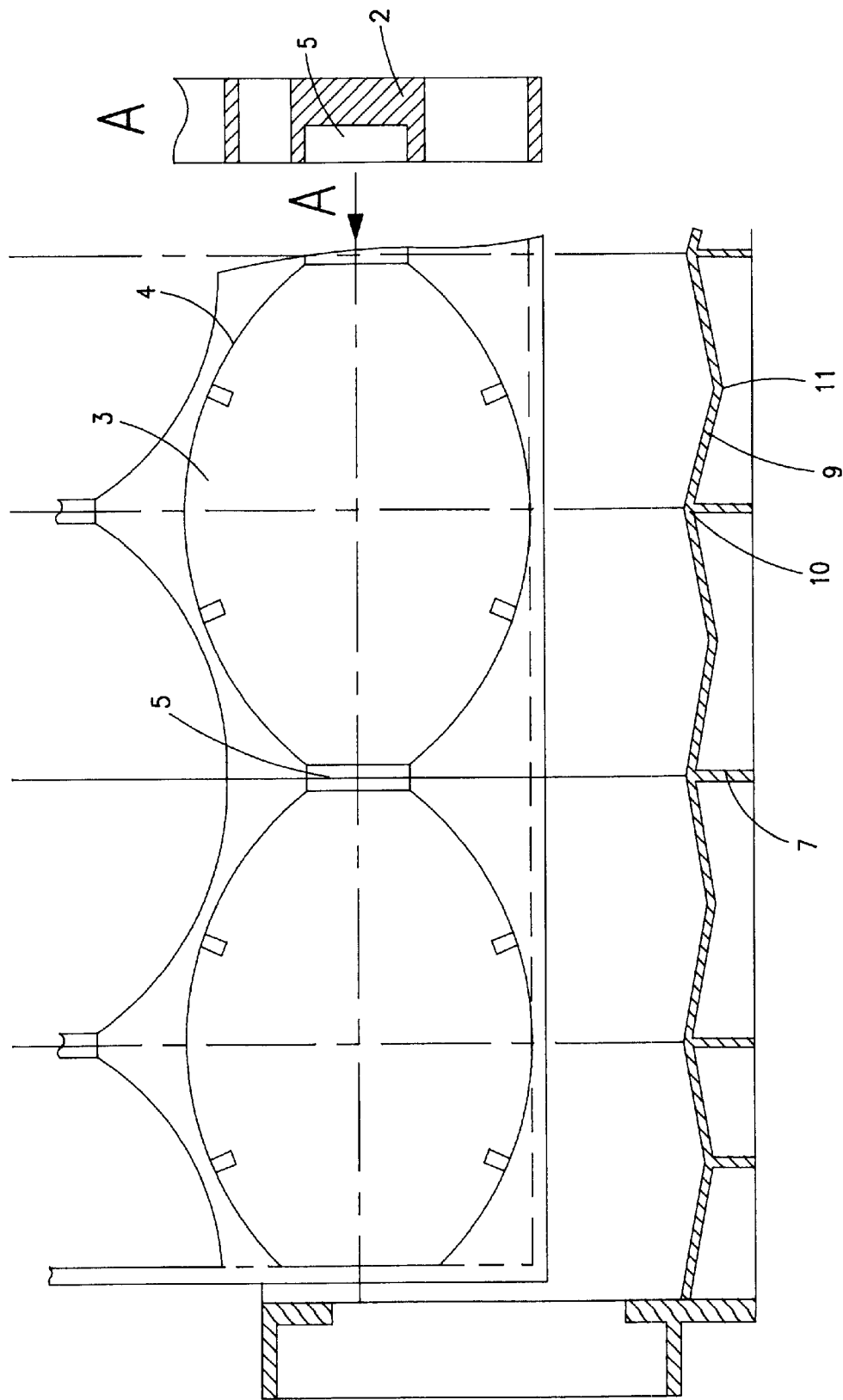
FIG. 4 is a view similar to FIG. 3 with the egg support rotated by 90°, and depicting a detail of an egg receptacle along line A.

The functional sequence is as follows: After the eggs 8 have been placed on the egg support 2 in random sequence and orientation, the incubation trays 1 are placed into a shelf or caddy (not shown) for insertion into an incubation machine (also not shown). During storage and transport the egg support 2 may be in a raised position, i.e. the egg support 2 is sufficiently removed from the bottom 7 of its tray 1 to prevent the eggs 8 from touching the bottom 7. Each egg 8 is then securely supported in its receptacle 3 by a plurality of radial protrusions. Four such protrusions are depicted in FIG. 4.

Before incubation commences, the egg support 2 is lowered to the bottom 7 of the tray 1 so that the eggs 8 in the receptacles 3 contact the bottom 7. Until then the eggs 8 are in their indiscriminate dispositions on the egg support 2. This disposition is unstable and does not satisfy the required stable and optimum incubation orientation.

The egg support 2 is then reciprocally moved relative to the bottom 7 of the tray 1 and normal to the elongate elevations and depression, by a drive not shown, and since the eggs 8 at this point are in engagement with the bottom 7, they are continually and incrementally moved in their cup-shaped receptacles 3 until they eventually assume their stable and optimum inclined incubation orientation of 20° relative to the plane of the support 2. The eggs 8 will remain in this orientation until they are hatched.

In this orientation, with the air chamber of each egg facing upwardly, the eggs 8 are incrementally rotated about their longitudinal axis turned at predetermined intervals so that incubation takes place with the eggs in two or more orientations. The eggs 8 remain in each of these orientations for a predetermined time and at the end of a cycle of such incremental movements they return to their initial orientation. Such incremental rotational movement may be achieved, for instance, by moving the egg support relative to the incubation tray in the direction of the elongations of the elevations and depressions.

This method of incubating the eggs 8 in two or more orientations has been found very favorably to affect the embryos in the eggs 8 as they can adjust to any new orientation within the time during which the eggs remain in those orientations and they will thus be moved to different nutrient areas. This is believed to be the reason for the superior results achieved by the method in accordance with the invention as compared to known methods.

Another advantage derived from the invention is that the method may be applied to variegated movements, such as rolling, tilting and rotational movements. The eggs 8 in their optimum incubation orientation may be shifted about their major as well as minor axes. Movement about these axes may take place separately or simultaneously.

Since the forward and backward movements of the reciprocal movements do not constitute a progressive movement in one direction but, rather, reversible movements, the eggs 8 will at the end of every movement cycle return to their initial orientation. This, too, is believed advantageously to affect the results of incubating in accordance with the invention.

Finally, it is to be observed that the method in accordance with the invention may also be practiced when eggs 8 are precisely placed by hand where the position of the air chamber can be determined in advance, so that eggs may be placed in their inclined orientation without any need for a centric placement of the receptacle relative to the elevations, in accordance with their shape and race.

Having described my invention, what I claim is:

1. An apparatus for incubating eggs, comprising:

means having a first substantially planar surface defining at least one opening of substantially elliptical configuration for supporting an egg in a predetermined orientation such that a portion of the egg protrudes through the opening in a predetermined orientation;

means provided with a second surface of at least one elongate elevation and depression for receiving the supporting means in superposition at a first level at which the egg is out of contact with the second surface and a second level at which the portion of the egg engages the surfaces.

2. The apparatus of claim 1, wherein the supporting means and the receiving means are movable relative to each other substantially in the direction of the major axis of the elliptical configuration at least when the supporting means is at the second level, whereby the position of the egg is shifted by its portion being in engagement with the second surface.

3. The apparatus of claim 2, wherein the elongation of the elevation and depression extends substantially normal to the major axis.

4. The apparatus of claim 3, wherein the elevation substantially coincides with the longitudinal center of the major axis.

5. The apparatus of claim 4, wherein the opening is dimensioned such that the egg penetrates therethrough.

6. The apparatus of claim 5, wherein the opening is provided with a plurality of circumferentially spaced radial protrusions for engaging the egg.

7. The apparatus of claim 6, wherein the elliptical opening at the ends of its major axis is provided with recesses penetrating below the first surface.

8. The apparatus of claim 7, wherein the supporting means is vertically movable relative to the receiving means between a first position in which the egg is out of engagement with the second surface and a second position in which the egg engages the second surface.

9. The apparatus of claim 8, wherein the supporting means is provided with a plurality of openings with their major axes extending substantially parallel to each other and wherein the second surface is provided with a plurality of alternating elevations and depressions.

10. A method of incubating at least one egg, comprising the steps of:

providing a substantially planar egg support having a first surface defining at least one opening of substantially elliptical configuration;

providing means for receiving the egg support and provided with a second surface having at least one elevation therein facing the opening;

placing an egg on the support to penetrate through the opening in a random orientation;

aligning the egg support relative to the receiving means with the first and second surfaces disposed in substantially parallel planes such that the egg engages the protrusion;

reciprocally moving the egg support relative to the receiving means in the parallel planes until the egg is in a predetermined orientation within the opening.

11. The method of claim 10, wherein in the predetermined orientation the major axis of the egg is disposed at an angle of about 20° relative to the first surface.

12. The method of claim 11, wherein the egg has an air chamber and wherein the air chamber faces upwardly when the egg is in the predetermined orientation.

13. The method of claim 12, further including the step of incrementally rotating the egg about its longitudinal axis.

14. The method of claim 13, wherein the egg support is provided with a plurality of openings of substantially elliptical configuration and the receiving means is provided with a plurality of elevations and further including the step of placing an egg into each opening.

\* \* \* \* \*